United States Patent
Huang et al.

(10) Patent No.: US 8,696,198 B2
(45) Date of Patent: Apr. 15, 2014

(54) TEMPERATURE RECORDER WITH RF TRANSMISSION INTERFACE

(75) Inventors: Wei-Chun Huang, Taipei (TW); Tsung-Hsing Hsieh, Taipei (TW)

(73) Assignee: Jogtek Corp., Taipei (TW)

( * ) Notice: Subject to any disclaimer, the term of this patent is extended or adjusted under 35 U.S.C. 154(b) by 255 days.

(21) Appl. No.: 13/218,408

(22) Filed: Aug. 25, 2011

(65) Prior Publication Data

US 2013/0051425 A1 Feb. 28, 2013

(51) Int. Cl.
*G01K 1/08* (2006.01)

(52) U.S. Cl.
USPC ...... 374/141; 340/870.17; 374/120; 374/183; 374/185; 374/101

(58) Field of Classification Search
USPC ......... 374/117–119, 120, 183, 185, 101, 141; 340/870.17
See application file for complete search history.

(56) References Cited

U.S. PATENT DOCUMENTS

| | | | | |
|---|---|---|---|---|
| 4,356,486 | A * | 10/1982 | Mount | 340/870.38 |
| 5,126,937 | A * | 6/1992 | Yamaguchi et al. | 600/301 |
| 6,452,826 | B1 * | 9/2002 | Kim et al. | 365/51 |
| 7,942,824 | B1 * | 5/2011 | Kayyali et al. | 600/538 |
| 2008/0089921 | A1 * | 4/2008 | Shachar | 424/423 |
| 2009/0109041 | A1 * | 4/2009 | Greeff | 340/601 |
| 2010/0171598 | A1 * | 7/2010 | Mehring | 340/10.5 |

OTHER PUBLICATIONS

Texas Instruments, MSP430x1xx Family: Users Guide (2006), pp. 178, 303-318.*

* cited by examiner

*Primary Examiner* — Lisa Caputo
*Assistant Examiner* — Janice M Soto
(74) *Attorney, Agent, or Firm* — Chun-Ming Shih; HDLS IPR Services

(57) ABSTRACT

A temperature recorder mainly includes a micro control unit (MCU), a temperature sensing circuit, a memory with RF transmission function, and at least one antenna unit. The MCU electrically connects to the temperature sensing circuit and the memory, and the antenna unit electrically connects to the memory. The temperature sensing circuit senses external temperature variations surrounding the temperature recorder, and the sensed temperature variations are progressed by the MCU and then stored into the memory in accordance with scheduled parameters. The temperature recorder can be connected externally through wired serial transmitting interface or wireless radio frequency (RF) transmitting interface when internal temperature data needs to be retrieved, or a new parameter needs to be written into the memory. Thus, the memory in the temperature recorder can be retrieved and written via both wired connection and wireless connection, the usage of the temperature recorder is more flexible.

12 Claims, 4 Drawing Sheets

TEMPERATURE RECORDER WITH RF TRANSMISSION INTERFACE

BACKGROUND OF THE INVENTION

1. Field of the Invention

The invention related to a temperature recorder, and in particular to a temperature recorder which can read or write internal memory via RF transmission interface.

2. Description of the Prior Art

Many times in daily life, we need to monitor and record temperature of observed objects through temperature sensors or temperature recorders. User can use the temperature sensors and the temperature recorders to monitor the temperature for preventing the objects from hurt due to a higher temperature or a lower temperature deviated from a standard value. The temperature sensors and the temperature recorders further can record temperature variation during a transportation of the objects. Therefore, user can determine attribution of responsibility when an accident occurs on the transportation of the objects.

However, traditional temperature sensors can only sense temperature status surrounding the observed objects, and transmits the sensed temperature data to a corresponding reader, but it fails to record whole temperature data during a certain period. It is to say, the temperature sensors can't satisfy the user who has a specific demand.

Traditional temperature recorder is a tiny apparatus used to attach on the observed objects, it senses temperature surrounding the objects by a sensor therein, and records the sensed temperature data in an internal memory for later inquiry by user. However, when the user needs to retrieve data from the memory, or to write new reference into the memory, he or she needs to dismantle a housing of the temperature recorder, and then connects wired serial transmission interface therein via physical circuit to retrieve from or to write data into the memory, it is very inconvenient.

SUMMARY OF THE INVENTION

The invention is to provide a temperature recorder with RF transmission interface, which can provide temperature variation data stored in an internal memory to be retrieved via both wired connection and wireless connection.

According to the present invention, the temperature recorder mainly includes a micro control unit (MCU), a temperature sensing circuit, a memory with RF transmission function, and at least one antenna unit. The MCU electrically connects to the temperature sensing circuit and the memory, and the antenna unit electrically connects to the memory. The temperature sensing circuit senses external temperature variation surrounding the temperature recorder, the sensed temperature variation is progressed by the MCU and then stored into the memory in accordance with scheduled parameters. The temperature recorder can be connected externally through wired serial transmitting interface or wireless radio frequency (RF) transmitting interface when internal temperature data needs to be retrieved, or a new parameter needs to be written into the memory.

In comparison with prior art, the present invention configures a memory therein to recode temperature variation data, the memory includes dual interfaces consisting of a traditional serial transmission interface and a radio frequency transmission interface, so users have convenience to retrieve from or to write data into the memory via wired or wireless connection.

Furthermore, the present invention can implement two antenna units, first antenna units is connected to the memory with RF transmission interface, and second antenna unit is connected to micro control unit. Therefore, the micro control unit can transmit data directly via the second antenna unit after carrier and modulation according to RF signal.

The two antenna units can use different frequencies or standards for connecting with different RF signal reader, thus, the present invention has flexibility in data retrieving, parameters updating and firmware up-gradation.

DETAIL DESCRIPTION OF THE INVENTION

The preferred embodiments of the present invention will be described in more detail with reference to the accompanying drawings. The drawings are provided for illustrating only, not intended for limiting the present invention.

Figure 1:
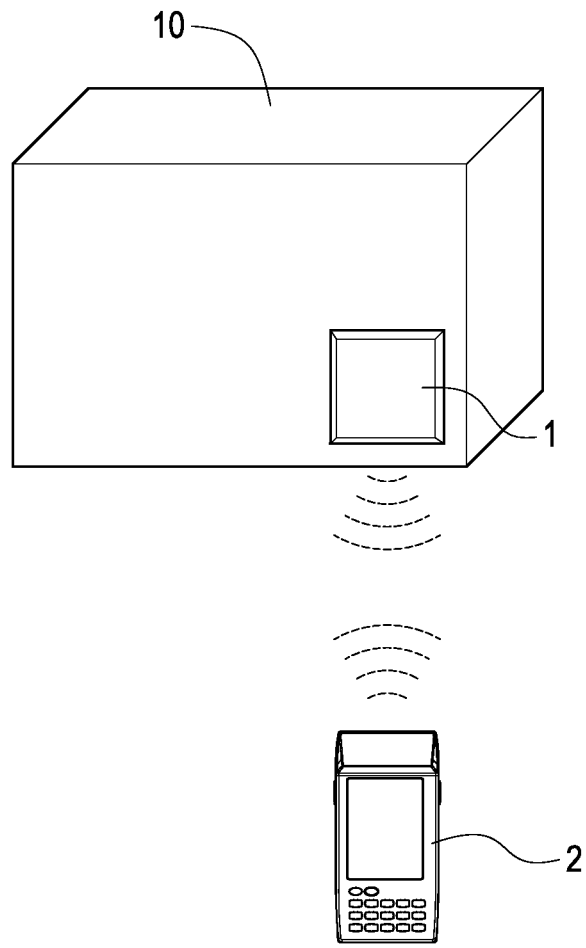
FIG. 1 is a schematic view showing the application of a temperature recorder according to the present invention

FIG. 1 is a schematic view showing the application of a temperature recorder according to the present invention. The temperature recorder 1 of the present invention is used to attach on an observed object 10, for example, food, medicines, or bacterin. The purpose of a sender or a receiver of the observed object 10 is to use the temperature recorder 1 to confirm whether the temperature status during transportation of the observed object 10 is matched a standard value or not, so as to determine attribution of responsibility when an accident occurs on the observed object 10.

Figure 2:
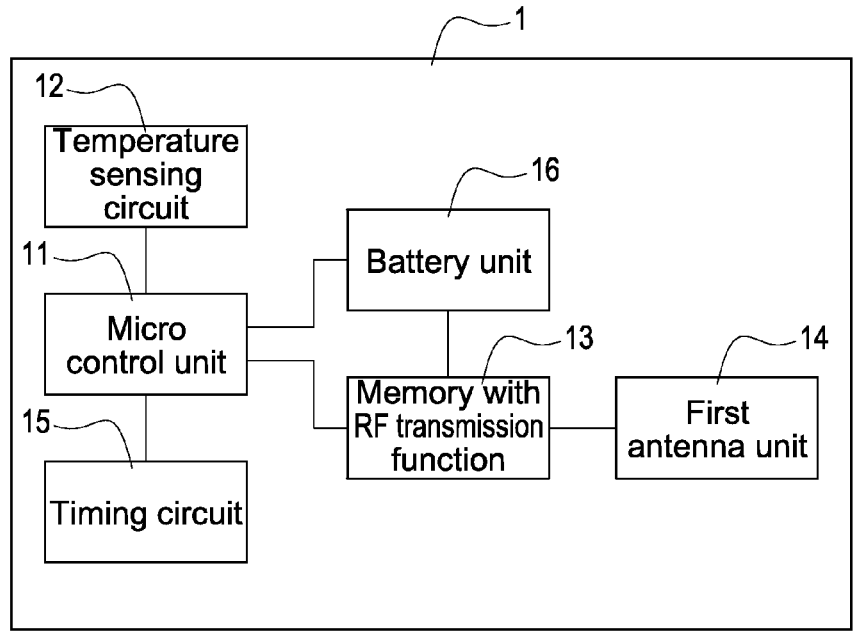
FIG. 2 is a block view of a first embodiment according to the present invention

FIG. 2 is a block view of a first embodiment according to the present invention. As shown in FIG. 2, the temperature recorder 1 of the present invention mainly includes a micro control unit (MCU) 11, a temperature sensing circuit 12, a memory with radio frequency function 13 (referred to as the memory 13 thereinafter), a first antenna unit 14, and a timing circuit 15.

The temperature sensing circuit 12 electrically connects to the MCU 11, and the temperature sensing circuit 12 mainly senses external temperature variations surrounding the temperature recorder 1. The memory 13 electrically connects to the MCU 11. The temperature variations sensed by the temperature sensing circuit 12 is stored into the memory 13 according to a scheduled parameter, such as a certain period or a certain time, therefore, temperature variation data is generated in the memory 13 by reference to the stored temperature variations.

In this embodiment of the present invention, the memory 13 is an electrically erasable programmable read-only memory (EEPROM), and in particularly, the memory 13 is a memory which includes dual transmission interfaces consisting of a serial transmitting interface and an RF transmission interface. The serial transmitting interface is an inter-integrated circuit (I2C) interface, and the RF transmission interface is a standard radio frequency transmission interface complied with international standards, such as ISO15693, ISO14443A, ISO14443B, ISO18092, Mifare, Felica, and so on. The international standards mentioned above are just examples, not intended to limit the scope of the present invention.

The first antenna unit 14 electrically connects to the memory 13, the temperature recorder 1 transmits the temperature variation data wirelessly through the first antenna 14 and the RF transmission interface of the memory 13. A user, for example, an engineer, can retrieve the temperature variation data stored in the memory 13 wirelessly by using a first RF signal reader 2 shown in FIG. 1.

The timing circuit 15 electrically connects to the MCU 11, and the timing circuit 15 provides clock cycle to the MCU 11, therefore, the MCU 11 generates oscillatory signal by reference to the received clock cycle.

The temperature recorder 1 can further includes a battery unit 16, which electrically connects to the MCU 11 and the memory 13, and the battery unit 16 provides electric power to the MCU 11 and the memory 13.

If the user needs to retrieve the temperature variation data stored in the temperature recorder 1, or needs to write new references into the memory 13, a housing of the temperature recorder 1 can be first dismantled, and then the wired serial transmission interface is used to retrieve from or to write data into the memory 13.

Alternatively, the user can use the first RF signal reader 2 to retrieve from or to write data into the memory 13 wirelessly via the RF transmission interface of the memory 13. Therefore, the user can use the temperature recorder 1 with more flexibility.

Figure 3:
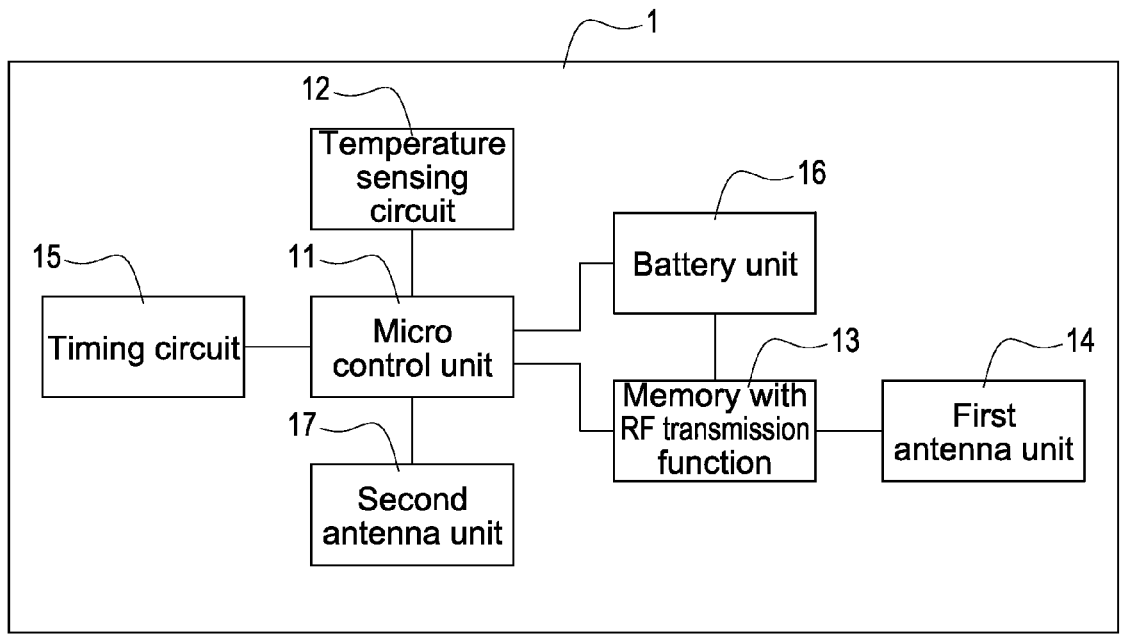
FIG. 3 is a block view of a second embodiment according to the present invention
Figure 4:
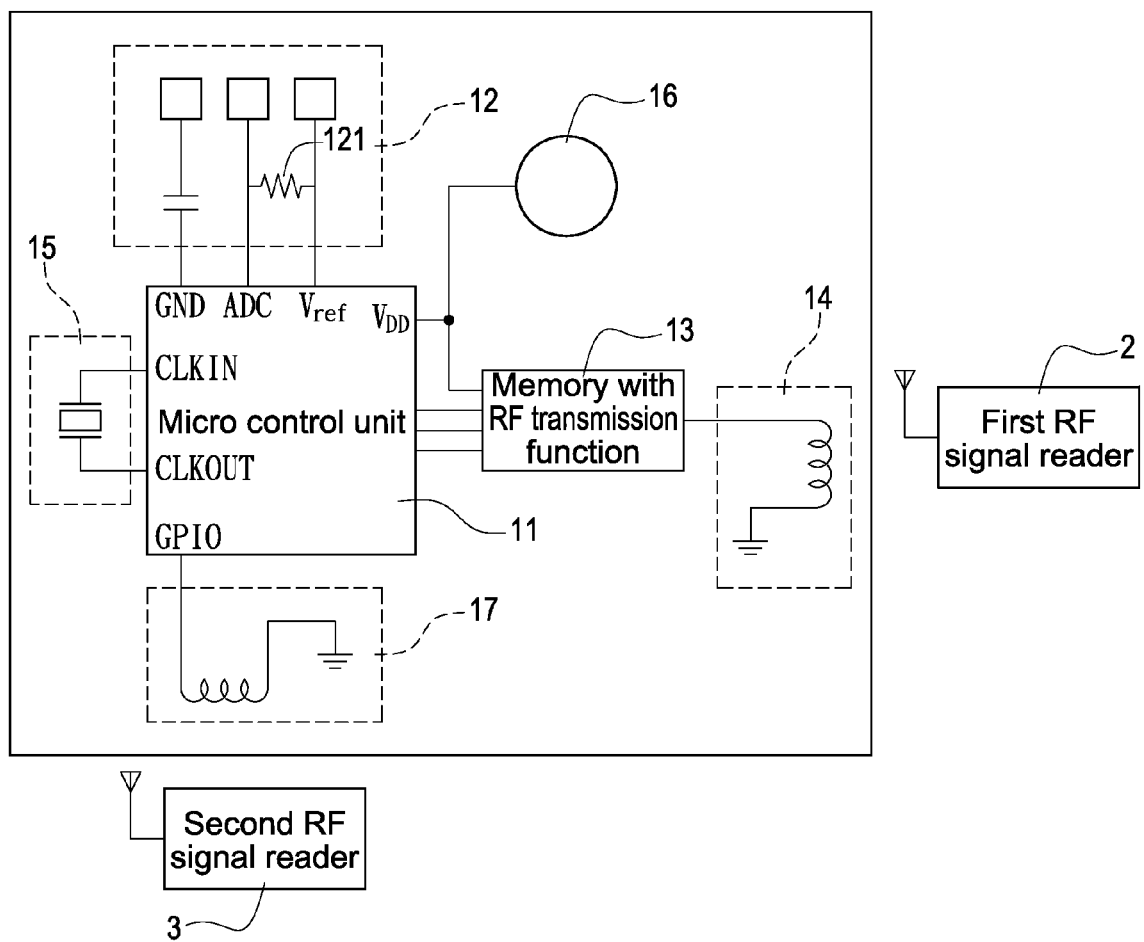
FIG. 4 is a block view of a third embodiment according to the present invention

FIG. 3 and FIG. 4 are block views of a second embodiment and a third embodiment according to the present invention. As shown in the figures, the timing circuit 15 mainly includes at least one crystal resonator (Xtal), and frequency used by the Xtal can be, for example but not limited to, 32.765 KHz.

The battery unit 16 of the present invention can be mercury batteries, for example, mercury batteries with model code of CR2016, CR2032, and etc. However, the above descriptions are just preferred embodiments, not intended to limit the scope of the present invention.

The temperature sensing circuit 12 includes at least one thermistor 121, and in particularly, the temperature sensing circuit 12 includes a negative temperature coefficient thermistor (NTC Thermistor), but not intended to limit the scope of the present invention. In this embodiment, the thermistor 121 electrically connects to a reference voltage (Vref) pin and an analog-to-digital converting (ADC) pin of the MCU 11.

Resistance of the thermistor 121 varies corresponding to the external temperature variations surrounding the temperature recorder 1. The MCU 11 of the temperature recorder 1 outputs a fixed reference voltage to the thermistor 121 through the Vref pin thereon, the reference voltage drops across the thermistor 121, and the MCU 11 receives the dropped reference voltage through the ADC pin which connects with the thermistor 12, and the MCU 11 converts the dropped reference voltage into digital signal to determine actual voltage. Therefore, the MCU 11 can make sure the resistance of the thermistor 121 via determining voltage difference, and then calculates the temperature variations surrounding the temperature recorder 1 via the resistance of the thermistor 121.

Figure 5A:
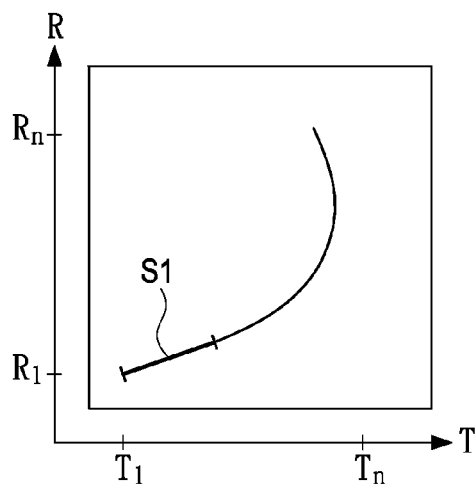
FIG. 5a is a schematic view of first variation of thermistor according to the present invention
Figure 5B:
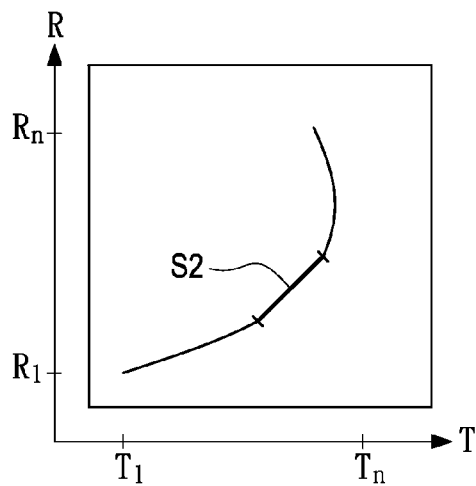
FIG. 5b is a schematic view of second variation of thermistor according to the present invention
Figure 5C:
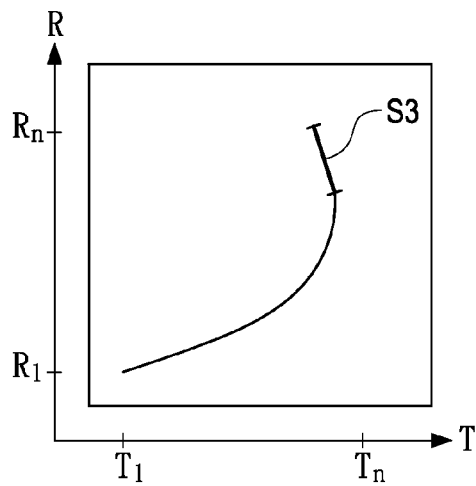
FIG. 5c is a schematic view of a third variation of thermistor according to the present invention

In particularly, the temperature sensing circuit 12 preferably consists of three thermistors 121 in parallel, and each of the three thermistors 121 has different features, but not intended to limit the scope of the present invention. FIG. 5a to FIG. 5c are schematic views of first variation to third variation of thermistor according to the present invention. The three thermistors 121 change their own resistances from R1 to Rn in accordance with external temperature changing from T1 to Tn, and the variations of the resistances of the three thermistors 121 are non-linear.

Therefore, the thermistors 121 can be corrected via another circuit of the temperature recorder 1, or via internal firmware of the MCU 11. Furthermore, the temperature sensing circuit 12 can consist of a plurality of thermistors 121 having different features in parallel, and capture the most linear variation part of each thermistor 121 at a specific temperature.

As shown in the figures, the temperature sensing circuit 12 captures the variation of first section S1 of the thermistor 121 shown in FIG. 5a, captures the variation of second section S2 of the thermistor 121 shown in FIG. 5b, and captures the variation of third section S3 of the thermistor 121 shown in FIG. 5c. The temperature sensing circuit 12 refers resistance of different thermistors in different temperature conditions, so as to accurately calculate the present temperature surrounding the temperature recorder 1. The descriptions mentioned above are just preferred embodiments, not intended to limit the scope of the present invention.

As shown in FIG. 3 and FIG. 4, the temperature recorder 1 of the present invention can further includes a second antenna unit 17, and the second antenna unit 17 electrically connects to the MCU 11. In particularly, the second antenna unit 17 electrically connects to a general purpose I/O (GPIO) pin of the MCU 11. The temperature recorder 1 can not only transmit the temperature variation data of the memory 13 wirelessly via the first antenna unit 14 and the RF transmission interface of the memory 13, but also transmit the temperature variation data directly via the second antenna unit 17 after carrier and modulation according to RF signal by the MCU 11, for example, transmits the temperature variation data wirelessly to a second RF signal reader 3 shown in FIG. 4.

In this embodiment, the temperature recorder 1 uses the MCU 11 to processes carrier and modulation directly according to RF signal through pulse width modulation (PWN) technology, and carrier frequency used by the MCU 11 can be, for example, 13.56 MHz of high frequency (HF) or 125 KHz of low frequency (LF), but not limited the scope of the present invention.

It should be mentioned that the first RF signal reader 2 corresponds to a specific frequency used by the first antenna unit 14, and the second RF signal reader 3 corresponds to another specific frequency used by the second antenna unit 17. Therefore, the temperature recorder 1 can transmit the temperature variation data to different readers via standard frequency or different frequencies of the RF transmission interface.

If the RF transmission interface of the memory 13 is a standard RF transmission interface complied with international standards, the user can set up a customized standard of carrier of the MCU 11 to communicate wirelessly with the second RF signal reader 3 via the customized standard which differs from international standards, as long as the second RF signal reader 3 corresponds to the second antenna unit 17. Therefore, the temperature recorder 1 of the present invention can be used with more flexibility.

More particularly, the MCU 11 can not only progress the carrier according to RF signal via the PWM technology, but also progress the carrier according to RF signal via the crystal oscillator.

Although the present invention has been described with reference to the foregoing preferred embodiments, it will be understood that the invention is not limited to the description thereof. Any equivalent variations and modifications can be made to those skilled in the art in view of the teaching of the present invention are also in the scope of the invention as defined in the appended claims.

What is claimed is:

1. A temperature recorder with RF transmission interface including:
   a micro control unit;
   a temperature sensing circuit electrically connected to the micro control unit, the temperature sensing circuit sensing external temperature variations surrounding the temperature recorder;
   a timing circuit electrically connected to the micro control unit, the timing circuit providing clock cycle to the micro control unit for generating oscillatory signal by the micro control unit;
   a memory with RF transmission function electrically connected to the micro control unit, the memory including dual transmission interfaces consisting of a wired serial transmitting interface and an RF transmission interface, the sensed temperature variations being stored into the memory for generating temperature variation data;
   and an antenna unit electrically connected to the memory directly;
   wherein the memory is configured to send the temperature variation data wirelessly via the antenna unit and the RF transmission interface of the memory, and the memory is configured to send the temperature variation data externally via the wired serial transmitting interface of the memory, wherein the temperature sensing circuit includes three thermistors having different features in parallel, and each thermistor electrically connects to a reference voltage pin and an analog-to-digital converting pin of the micro control unit, and wherein the temperature sensing circuit combines a first linear variation part of one thermistor at a first specific temperature range, a second linear variation part of the other thermistor at a second specific temperature range, and a third linear variation part of another thermistor at a third specific temperature range for sensing the external temperature variations.

2. The temperature recorder of claim 1, wherein the memory with RF transmission function is an electrically erasable programmable read-only memory (EEPRON), the serial transmission interface of the memory is an inter-integrated circuit (I2C) interface, and the RF transmission interface of the memory is a standard radio frequency transmission interface complied with international standards.

3. The temperature recorder of claim 2, wherein the timing circuit includes at least one crystal oscillator, and frequency used by the crystal oscillator is 32.768 KHz.

4. The temperature recorder of claim 2, wherein the temperature recorder further includes a battery unit electrically connected to the micro control unit and the memory with RF transmission function.

5. A temperature recorder with RF transmission interface including:
   a micro control unit;
   a temperature sensing circuit electrically connected to the micro control unit, the temperature sensing circuit sensing external temperature variations surrounding the temperature recorder;
   a timing circuit electrically connected to the micro control unit, the timing circuit providing clock cycle to the micro control unit for generating oscillatory signal by the micro control unit;
   a memory with RF transmission function electrically connected to the micro control unit, the memory including dual transmission interfaces consisting of a wired serial transmitting interface and an RF transmission interface, the sensed temperature variations being stored into the memory for generating temperature variation data;
   a first antenna unit electrically connected to the memory directly;
   and a second antenna unit electrically connected to a general purpose I/O (GPIO) pin of the micro control unit;
   wherein the memory is configured to send the temperature variation data to a first RF signal reader wirelessly via the first antenna unit and the RF transmission interface of the memory, and the micro control unit is configured to directly send the temperature variation data to a second RF signal reader wirelessly via the second antenna unit after carrier and modulation according to RF signal, wherein the temperature sensing circuit includes three thermistors having different features in parallel, and each thermistor electrically connects to a reference voltage pin and an analog-to-digital converting pin of the micro control unit, and wherein the temperature sensing circuit combines a first linear variation part of one thermistor at a first specific temperature range, a second linear variation part of the other thermistor at a second specific temperature range, and a third linear variation part of another thermistor at a third specific temperature range for sensing the external temperature variations.

6. The temperature recorder of claim 5, wherein the micro control unit processes carrier and modulation according to RF signal through pulse width modulation (PWM) technology.

7. The temperature recorder of claim 6, wherein carrier frequency used by the micro control unit is 13.56 MHz.

8. The temperature recorder of claim 6, wherein carrier frequency used by the micro control unit is 125 KHz.

9. The temperature recorder of claim 5, wherein the memory with RF transmission function is an electrically erasable programmable read-only memory (EEPROM), the serial transmission interface of the memory is an inter-integrated circuit (I2C) interface, and the RF transmission interface of the memory is a standard radio frequency transmission interface complied with international standards.

10. The temperature recorder of claim 9, wherein the timing circuit includes at least one crystal oscillator, and frequency used by the crystal oscillator is 32.768 KHz.

11. The temperature recorder of claim 10, wherein the micro control unit progresses carrier according to RF signal via the crystal oscillator.

12. The temperature recorder of claim 9, wherein the temperature recorder further includes a battery unit electrically connected to the micro control unit and the memory with RF transmission function.

* * * * *